United States Patent
Timsjo et al.

(10) Patent No.: US 9,651,926 B2
(45) Date of Patent: May 16, 2017

(54) SYSTEM, METHOD, WORK STATION AND COMPUTER PROGRAM PRODUCT FOR CONTROLLING AN INDUSTRIAL PROCESS

(71) Applicant: ABB Research Ltd., Zurich (CH)

(72) Inventors: Susanne Timsjo, Vasteras (SE); Martin Olausson, Vasteras (SE)

(73) Assignee: ABB Research Ltd., Zurich (CH)

( * ) Notice: Subject to any disclaimer, the term of this patent is extended or adjusted under 35 U.S.C. 154(b) by 627 days.

(21) Appl. No.: 14/085,404

(22) Filed: Nov. 20, 2013

(65) Prior Publication Data

US 2014/0081430 A1    Mar. 20, 2014

Related U.S. Application Data (63) Continuation of application No. PCT/EP2011/058301, filed on May 20, 2011.

(51) Int. Cl.
*G06F 3/048*    (2013.01)
*G05B 15/02*    (2006.01)
(Continued)

(52) U.S. Cl.
CPC ......... *G05B 15/02* (2013.01); *G05B 19/0426* (2013.01); *G05B 23/0216* (2013.01);
(Continued)

(58) Field of Classification Search
CPC ........................ G05B 23/0216–23/0267; G05B 2219/13144–2219/36168; G06F 3/016;
(Continued)

(56) References Cited

U.S. PATENT DOCUMENTS 5,525,978 A    6/1996    York et al.
2005/0028110 A1    2/2005    Vienneau et al.
(Continued)

FOREIGN PATENT DOCUMENTS

EP    1965301 A1    9/2008
WO    2008070247 A2    6/2008

OTHER PUBLICATIONS

International Preliminary Report on Patentability Application No. PCT/EP2011/058301 Completed: Aug. 16, 2013 26 pages.
(Continued)

*Primary Examiner* — Claudia Dragoescu
(74) *Attorney, Agent, or Firm* — Whitmyer IP Group LLC (57) ABSTRACT

A work station for monitoring and control of an industrial process includes a human machine interface unit for presenting the industrial process in process graphics for an operator. The interface unit is communicatively and operatively connectable to an industrial process, and the work station is provided with a shortcut navigator for coupling a key of a physical keyboard to a process graphic or entity of a process graphic. The shortcut navigator includes a presenter, which is adapted to present a virtual keyboard in the process graphic, and an assigner, which is adapted to assign a shortcut to the currently presented process graphic or entity of the process graphic. The shortcut couples a specific key of the physical keyboard to the presented process graphic, or to the process graphic of the entity, respectively. A method, system, and computer program for monitoring and controlling an industrial process is also provided.

12 Claims, 4 Drawing Sheets (51) Int. Cl.
*G05B 19/042* (2006.01)
*G06F 3/0489* (2013.01)
*G05B 23/02* (2006.01)

(52) U.S. Cl.
CPC ............ *G06F 3/04895* (2013.01); *G05B 2219/25067* (2013.01); *G05B 2219/31467* (2013.01); *G05B 2219/31472* (2013.01)

(58) Field of Classification Search
CPC ........ G06F 3/048–3/04895; G06F 8/34; G06F 9/4443; G06F 2203/04809
See application file for complete search history.

(56) References Cited

U.S. PATENT DOCUMENTS

| | | |
|---|---|---|
| 2006/0152495 A1 | 7/2006 | Gombert |
| 2007/0179641 A1 | 8/2007 | Lucas et al. |
| 2009/0183098 A1 | 7/2009 | Casparian et al. |
| 2009/0307632 A1 | 12/2009 | Hasegawa et al. |
| 2010/0050103 A1* | 2/2010 | Husoy ............... G06F 9/4443 715/765 |
| 2010/0169818 A1* | 7/2010 | Hughes ............. G06F 3/0481 715/773 |
| 2011/0028194 A1 | 2/2011 | Tang et al. |
| 2012/0198547 A1* | 8/2012 | Fredette ............ G06F 8/34 726/19 |

OTHER PUBLICATIONS

International Search Report and Written Opinion of the International Searching Authority Application No. PCT/EP2011/058301 Completed: Jan. 23, 2012; Mailing Date: Jan. 30, 2012 14 pages.
Written Opinion of the International Preliminary Examining Authority Application No. PCT/EP2011/058301 Mailing Date: Apr. 24, 2013 10 pages.

* cited by examiner

SYSTEM, METHOD, WORK STATION AND COMPUTER PROGRAM PRODUCT FOR CONTROLLING AN INDUSTRIAL PROCESS

FIELD OF THE INVENTION

The invention relates to industrial control systems; targeting functionality provided through the HMI, Human machine interface, of industrial control and/or automation systems.

BACKGROUND OF THE INVENTION

The invention relates to industrial control systems used for monitoring and control of an industrial process such as controlling and monitoring a power plant for generating electric power, an oil refinery or chemical plant, a pulp and paper industry, food processing or for manufacturing of goods, and the like activities.

Industrial control and automation systems, such as SCADA systems (Supervisory Control and Data Acquisition) or DCS systems (Distributed Control Systems), are computer based system used for monitoring and control of an industrial process. A DCS system is typically built on processes and controllers, buses are used for communication. Input and Output devices are components in the DCS system and the processors communicate the information through the input to the output components. The input components get signals from input instruments in the field (the physical process) and send the information further to the out put instruments in the field, finally the processor connects these components and buses connects the information to the HMI from where the process is monitored and controlled. The process is monitored through process graphics. While monitoring a process critical events and alarms are presented in the HMI to make the user aware of each situation and in control of the whole process.

800xA is DCS system used for process control. The process is monitored and controlled by users, operators, from the HMI. The HMI is typically presented on several LCD displays, and is visualising a process, the process objects and their performance. The HMI can be presented and divided on different monitors. To control the process from the HMI typically a mouse and a keyboard are used. The keyboard is provided both with an alpha-numeric "standard" keyboard section.

The process is visualised and presented in the HMI in process graphics. An industrial plant is typically presented in several process graphics divided in a tree hierarchy from overview displays to more detailed process graphics, presenting and visualizing different parts of the process. More detailed described, each part of the process is divided into several subareas and more detailed process graphics in a plurality of levels of detail of the object, a first sublevel visualising a plurality of subareas of a main process picture, and a second sublevel visualising subareas of the first sublevel process pictures. The process objects, field devices as valves, tanks, engines, process objects to be monitored are presented in the process graphics, one process graphic is typically built up with instances of several process objects to describe one area of the industrial process. The process objects are related to different types of information, for example installation notes, alarms, parameters and this information can be accessed via the process graphics. In 800xA access to the process object's specific information is available in using context menus by right-clicking on the specific process object. In the context menu it is possible for example to access trends, alarms and other process dependent specific information. Examples of process object information are trend displays visualizing the process data, and the alarms related to this specific process object. The faceplate is one kind of information that can be accessed from the process objects using the process graphics, in 800xA faceplates are used to control the industrial process.

An operator monitors and controls an underlying industrial process by interacting with the HMI. The HMI (see FIG. 5 at work stations 51) is communicatively and operatively connected with I/O units, for example field devices 57, 58, 59, to the industrial process 50 and receives information for monitoring and controlling of the underlying industrial process via the field devices 57, 58, 59, this communication typically include at least one server, such as a control server 54 and a protection server 55, a database 53 and communication buses 52, 56. The field devices 57-59 are provided to monitor physical properties of the process 50 and the objects of the process, and the operator can control the industrial process 50 and the objects of the process from the HMI 51 and through the field devices 57-59 that interacts with the objects of the process. The physical properties that should be monitored are defined and the system control functions are configured, when the system is installed and adapted for the specific underlying industrial process. For example, sensors for temperature, pressure, voltage, power, liquid levels and on/off status are arranged on or near process objects, such as pumps, motors, manufactured products etc. The sensors are connected to the field devices (or similar I/O units) and measurements are available to the operator in the process graphics by means of the control and monitoring system communicating with the sensors and transferring the data to the workstation 51 for presentation in the HMI, such as in a process graphics showing an area or subarea of the industrial process 50. Moreover, the control signal transfer operator commands, such as inputted by the operator from a keyboard, from the work station 51 through the control system to I/O units that are operatively connected to control the objects of process; objects like motors, pumps, transformers, circuit breakers, lifting devices, containers, transport belts, coolers and heaters.

Figure 5:
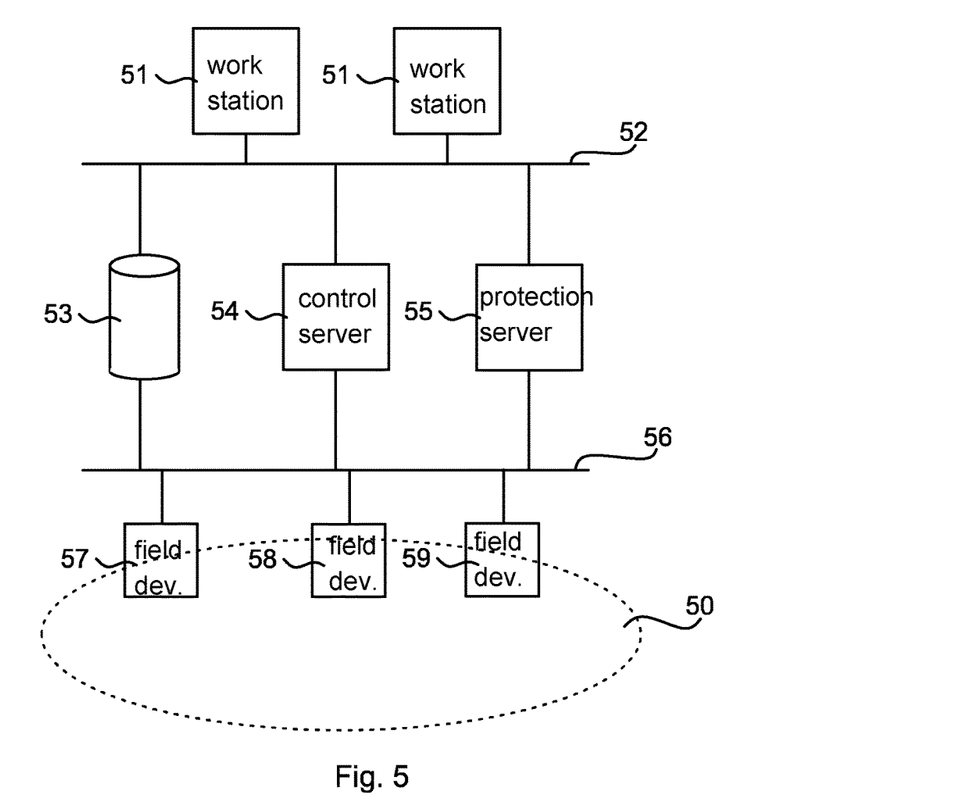

With the HMI (of work station 51), the operator can monitor status information of the industrial process 50 obtained by the control system, and control the industrial process by control commands in the control system. Such interaction should be easy and reliable. In 800xA, it is possible to use already defined short cuts for easy access on the present picture view, for example to process graphics for retrieving information of particular importance during a specific event, presently or in the near future.

EP 1 965 301 discloses a method for providing a user interface for an industrial control system comprising a computer and a plurality of process graphics comprising software objects for controlling and/or monitoring real world objects controlled by said control system. A display of selected process graphics, a designated view arranged with a tab or other selection means, is automatically generated. The designated view is generated dependent on selecting one or more logical groupings to which control system software objects representing the real world objects belong.

US2010/169818 discloses a computer-implemented method of navigating a GUI. The method can include, responsive to a user input initiating a navigation mode, overlaying, atop of the GUI located within a first layer, a virtual keyboard within a second layer, wherein the virtual keyboard includes a plurality of virtual keys. The method can include, for each virtual key, associating the virtual key with a region of the first layer including an area of the GUI beneath the virtual key. The method can include mapping each virtual key with a physical key of a physical keyboard communicatively linked with a computer rendering the GUI and, responsive to a user input selecting a physical key of the physical keyboard, selecting a region corresponding to the selected physical key. A level of magnification for the selected region can be increased within the first layer while keeping the virtual keyboard sizing constant.

SUMMARY OF THE INVENTION

It is an object of the invention to provide user friendly navigation in a graphical interface of an industrial process, the navigation can be between process graphics of varying levels of detail, or other relevant information needed for the daily monitoring.

For this purpose, the invention provides a monitoring and control system comprising a graphical user interface provided with a shortcut navigator.

It is important that such user interfaces provide a user friendly way of handling such a shortcut feature, especially since adding shortcuts may be done as a user response to critical events in the underlying industrial process.

In the embodiments of the monitoring and control system, an aim of the shortcut navigator is not only to simplify navigation in process pictures of the graphical user interface, but also facilitate effective monitoring and control of the industrial process.

The present invention therefore provides means for providing shortcuts to the different process graphics and also different information as trend or alarm for process objects.

For these purposes the present invention provides a system for monitoring and control of an industrial process, which monitoring and control system is communicatively and operatively connectable to an industrial process, such as via I/O units preferably field devices, and which monitoring and control system also is arranged and adapted to provide measurements of the industrial process and control the objects of the industrial process. The monitoring and control system comprises a work station comprising a human machine interface unit for presenting the industrial process in a process graphic, such as on a display screen, for an operator. The work station is provided with a shortcut navigator for coupling a key of a physical keyboard to a process graphic, or entity of a process graphic. The shortcut navigator comprises a presenter adapted to present a virtual keyboard in the process graphic, which virtual keyboard is overlaid on the currently presented process graphic, and comprises an assigner, which is adapted to assign a shortcut to the currently presented process graphic or entity of the currently presented process graphic, which shortcut couples a specific key of the physical keyboard to the presented process graphic or the process graphic of the entity, respectively.

In an embodiment, the assigner is adapted to couple a specific key upon an operator striking that specific key on the physical keyboard.

In an embodiment, the shortcut navigator comprises an appearance controller; the appearance controller is adapted to modify the graphical representation of a key of the virtual keyboard, when the key provides a shortcut.

In an embodiment, the graphical representation of the key in the virtual keyboard is modified to present a thumbnail picture of the process graphic to which it provides a shortcut.

In an embodiment, the shortcut navigator comprises a state controller for controlling the state of each short cut presented on the navigator, which is adapted to modify the graphical representation, preferably modify the graphical state dynamically, to reflect a changed state of the industrial process monitored in the process graphic coupled to the key by the shortcut. Preferably the state controller is adapted to monitor the state of the shortcut destination and update the state dynamically, such as changing colour to alarm or to indicate a completed action or achieving a target value.

In an embodiment, the shortcut navigator is adapted to present the virtual keyboard upon an operator striking, and preferably holding down, a dedicated navigator key on the keyboard.

In an embodiment, the virtual keyboard is presented as an overlay, with the process graphic visible behind the virtual keyboard.

The invention also provides a work station for monitoring and control of an industrial process, the work station comprises a human machine interface unit for presenting the industrial process in process graphics for an operator, wherein the human machine interface is communicatively and operatively connectable to the industrial process. The work station is further provided with a shortcut navigator for coupling a key of a physical keyboard to a process graphic or entity of a process graphic, wherein the shortcut navigator comprises a presenter, which is adapted to present a virtual keyboard in the process graphic, and an assigner, which is adapted to assign a shortcut to the currently presented process graphic or entity of the process graphic, which shortcut couples a specific key of the physical keyboard to the presented process graphic or to the process graphic of the entity, respectively.

In an embodiment, the assigner is adapted to couple a specific key upon an operator striking that specific key on the physical keyboard.

In an embodiment the shortcut navigator comprises an appearance controller, which appearance controller is adapted to modify the graphical representation of a key in the virtual keyboard, when the key provides a shortcut.

In an embodiment, the graphical representation of the key in the virtual keyboard is modified to present a thumbnail picture of the process graphic to which it provides a shortcut.

In an embodiment, the shortcut navigator comprises a state controller, which state controller is adapted to modify the graphical representation to reflect a changed state of the industrial process monitored in the process graphic coupled to the key by the shortcut, preferably the state controller is adapted to monitor the state of the shortcut destination and update the state dynamically.

In an embodiment, the shortcut navigator is adapted to present the virtual keyboard upon an operator striking a dedicated navigator key on the keyboard.

In an embodiment, the virtual keyboard being presented as an overlay, with the process graphic visible behind the virtual keyboard.

The invention also provides a method for assigning a shortcut to a process graphic of a human machine interface, which human machine interface is adapted for presenting an industrial process to an operator in process graphics of the industrial process, the human machine interface being communicatively and operatively connectable to the industrial process, and includes a physical keyboard arranged for an operator to interact with the process graphics. The method comprises presenting a process graphic, presenting a virtual keyboard in the process graphic, and assigning a shortcut to the presented process graphic or to an entity of the presented process graphic, which shortcut couples a specific key of the physical keyboard to the presented process graphic, or to the process graphic of the entity, respectively.

In an embodiment, the assigning of the specific key is performed as a response to an operator striking that specific key on the physical keyboard.

In an embodiment, the method includes modifying the graphical representation of a key in the virtual keyboard, when the key provides a shortcut.

In an embodiment, the key in the virtual keyboard is modified into presenting a thumbnail picture of the process graphic to which it provides a shortcut.

In an embodiment, the method includes modifying the graphical representation to reflect a changed state of the industrial process monitored in the process graphic coupled to the key by the shortcut, preferably monitoring the state and repeating the modifying when the monitored state changes.

In an embodiment the presentation of the virtual keyboard in the process graphic is performed as a response to an operator striking a key dedicated for navigation, on the physical keyboard.

In an embodiment the presentation of the virtual keyboard includes presenting the virtual keyboard as an overlay, with the process graphic visible behind the virtual keyboard.

The invention also provides a computer program product for monitoring and control of an industrial process, which computer program being adapted for controlling a work station, which is communicatively and operatively connectable to the industrial process, and which a work station comprising a human machine interface unit for presenting the industrial process in process graphics for an operator. The computer program product is adapted to enable the work station to assign a shortcut to a process graphic of the human machine interface in accordance with the steps of the method above. Thus, the program product enable the work station to present a virtual keyboard in the process graphic, and assign a shortcut to a key of a physical keyboard. The shortcut leading to a process graphic, e.g. the process graphic that was presented when the shortcut was assigned, the process graphic of an object of the process graphic that was presented when the shortcut was assigned, or to another entity such as an item in a context menu of an object of the process graphic that was presented when the shortcut was assigned.

A shortcut navigator of the invention is realised by software interacting with hardware to present shortcuts in a process graphic of the HMI. The shortcut navigator may suitable be integrated in a computer program for monitoring and controlling an industrial process. The computer program, when run on a work station, is adapted to present the process graphics for the HMI.

The shortcut navigator is adapted to assign keys of a physical keyboard and/or computer mouse, to a specific process graphic or specific process object, so that striking of the assigned key change the process graphic into the specific process graphic, or specific process object, assigned to the key.

The shortcut navigator is adapted to present a visual representation of a keyboard, or virtual keyboard, in a process graphic, preferably adapted to present the virtual keyboard as an overlay in the process graphic. The overlay can suitable be made semi-transparent. The keys of the virtual keyboard are suitably provided with symbols, such as characters and numbers, which symbols correspond to symbols on a physical keyboard of the work station.

The shortcut navigator may further be adapted to change the visual appearance of the each one of the virtual keyboard keys, when the key in question is assigned a shortcut. The visual appearance is preferably changed into a dynamic thumbnail or the process graphic of the destination of the shortcut, such as a thumbnail of the process graphic or process object. Furthermore, the shortcut navigator should preferably be adapted to retrieve information of the destination via the work station that provides such information from the industrial process. The shortcut navigator may suitably be adapted to reflect the retrieved information in the thumbnail, such as changing colour, form, size, and dynamically change these parameters.

BRIEF DESCRIPTION OF THE DRAWINGS

The invention will in the following be described in more detail with reference to the accompanying drawings, which are illustrating the invention for facilitating performing of the invention and therefore are simplified. The figures are not drawn to scale.

DETAILED DESCRIPTION OF THE INVENTION

Methods for efficient shortcut handling in graphical user interfaces as such, have been provided in other fields of use, such as graphical interfaces for personal computers and computer games. In US2011/0028194 (D1) a graphical user interface have action keys and describes a method for reconfiguring such action keys by a drag-and-drop mouse action that links a specific button of the mouse to a specific action. A virtual image of a computer mouse is visualized in a graphical user interface and items in an action key menu are coupled to a button by means of a drop and drag interaction between the action keys and the buttons of the virtual mouse.

Figure 1:
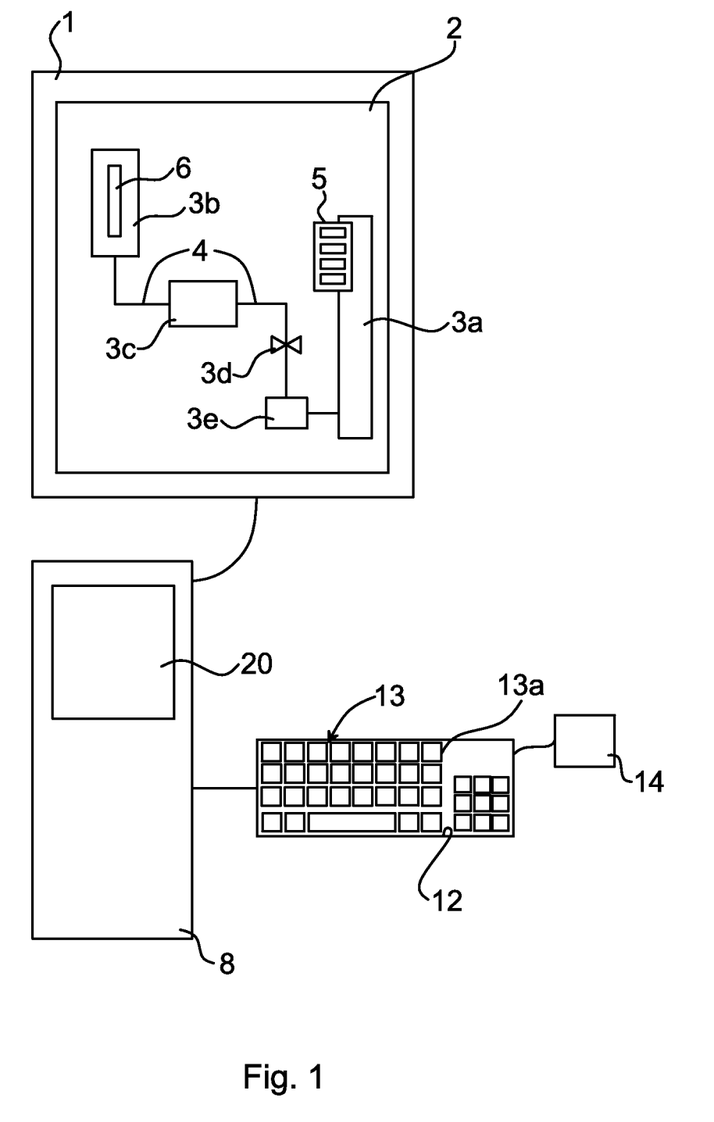
FIG. 1 illustrates a Human Machine Interface with a process graphic suitable for implementation of the invention.

FIG. 1 illustrates an HMI screen 1 of a work station (51 exemplified in FIG. 5), which HMI 1 comprises a process graphic 2 illustrating a part of an industrial process. The process graphic 2 includes process objects 3*a*-*e*, which are visual representations of physical objects in the industrial process. The process graphic 2 also includes connections 4 between the process objects 3*a*-*e* that symbolise physical interconnections, such as pipes. For illustrating purposes, one of the process objects 3*b* also includes a small display 6 that presents a value of a measured property of the object 3*b*. Process object 3*a* is illustrated with an open context menu 5 in the form of a drop down list. The work station is a combination of software and hardware, such as a computer, or control unit 8, with memories and an executable computer program, and is adapted for user interaction with the process graphic 2 by means of a keyboard 12 and computer mouse 14. The software and hardware combination of the work station is designed to provide the functions and interaction possibilities that an operator has.

The work station is further adapted to provide the process objects 3a-e as clickable icons in the process graphic 2. Upon clicking on a process object 3a-e, a menu 5 or menus, for interacting with the process object 3a-e are presented in the same process graphic 2, which menu 5 may be a drop down list or the like controllable by means of the computer mouse 14. The menu, or menus, includes a control menu, or faceplate, for controlling the (physical) process object and a monitoring menu for the monitoring functions of the process object. The monitoring functions may be alarms and trend curves.

Navigation to another process graphic, such as a process graphic of a sub area of the industrial process, is provided for the operator. For this purpose the work station is adapted to move to another process graphic as a response to an operator interaction with the keyboard or mouse.

Figure 2:
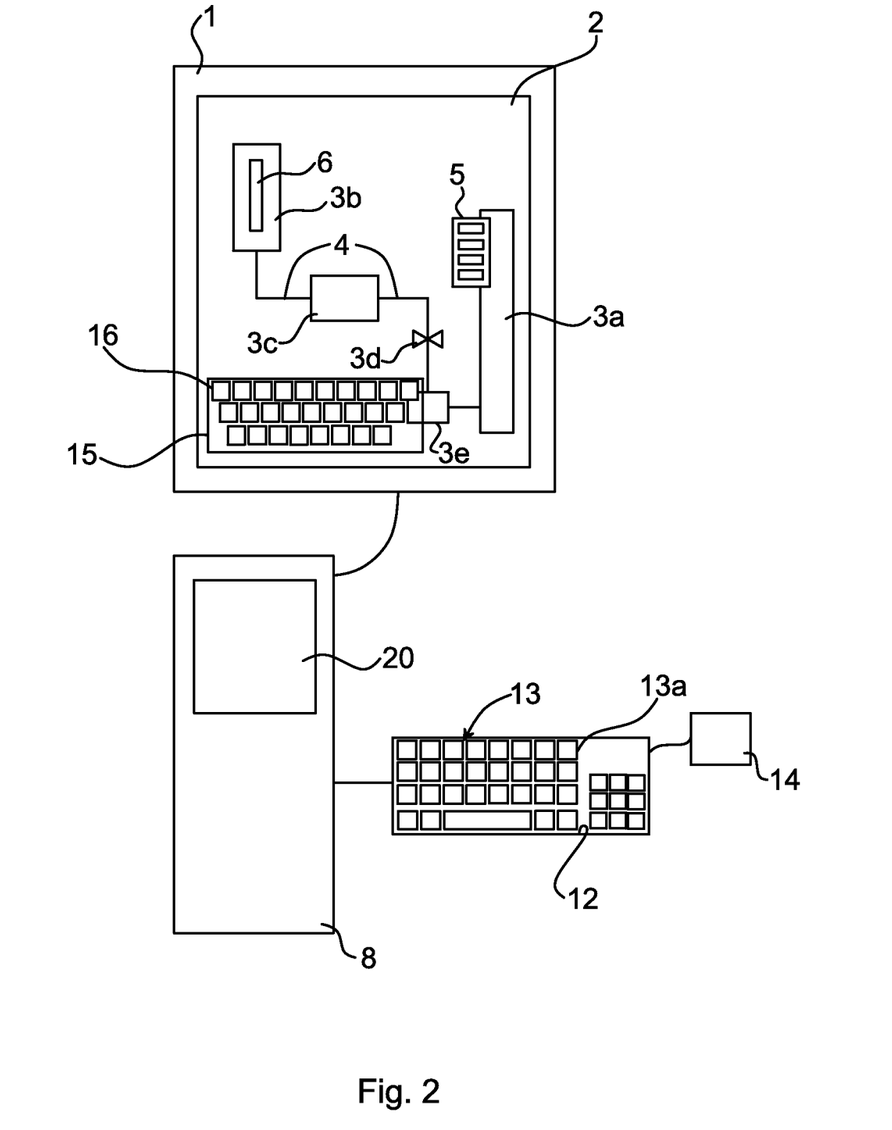
FIG. 2 illustrates the Human Machine Interface of figure, wherein a shortcut navigator according to the invention is used with the process graphic.

FIG. 2 illustrates the same process graphic as in FIG. 1, with a virtual keyboard 15 overlaying the process graphic 2. The virtual keyboard 15 includes keys 16, which corresponds to physical keys 13 of the physical keyboard 12. Preferably, the virtual keyboard includes a substantially full set of alphabetical keys, and the physical keyboard including substantially the same alphabetical keys, but also additional keys such as numbers and function keys, in correspondence with standard computer and workstation keyboards. The control unit 8 is operatively connected with the keyboard 12, a computer mouse 14 and the HMI 1 screen. The control unit 8 comprises a shortcut navigator 20, which suitably can be implemented as a computer program that provides the shortcut navigating functionality when executed by the control unit 8.

The shortcut navigator 20 is adapted to present the virtual keyboard 15 in the process graphic 2, preferably as a response to user interaction with keyboard 12 or mouse 14, such as striking a key 13 or clicking with the mouse 14.

Figure 3:
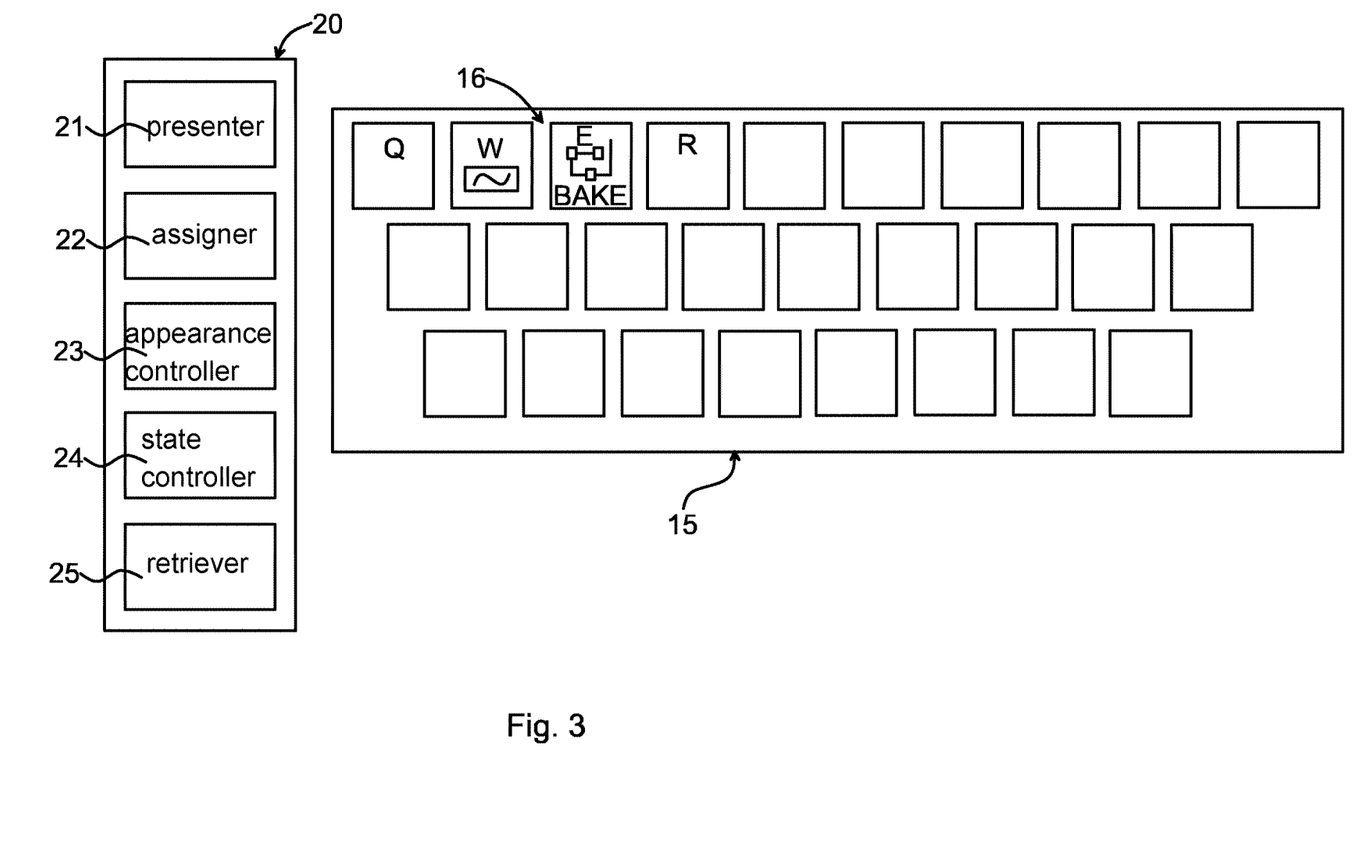
FIG. 3 illustrates a shortcut navigator of the invention.

FIG. 3 illustrates the shortcut navigator 20 in more detail. The shortcut navigator 20 includes a presenter 21 for introducing the virtual keyboard (15) into the process graphic (2). The presenter 21 can suitably be adapted to introduce the virtual keyboard (15) as a transparent or semi-transparent overlay so that the process graphic is visible, or visible with limited visibility respectively, through the virtual keyboard (15). The presenter 21 is adapted to introduce the virtual keyboard as a response to an operator interaction, such as striking a key of the physical keyboard. A specific key of the keyboard can be used, and the shortcut navigator may be programmed to keep the keyboard in the process graphic as long as the key is depressed, where after it is removed. Alternatively, the presenter can be adapted to introduce the virtual keyboard as a response to a keystroke or mouse click, and be adapted to remove the virtual keyboard as a response to another keystroke, or mouse click.

The shortcut navigator 20 also comprises an assigner 22 that is provided to assign a shortcut to an entity of the process graphic (2). The assigner 22 is provided to assign such a shortcut as a response to an operator interaction using the keyboard or the mouse. The shortcut provided by the assigner 22 links a key (13) of the physical keyboard (12) to the entity of the process graphic, such an entity as a process graphic (2) of an area or subarea of the industrial process, a process object (3a-e) or an item in a context menu (5) of an object in the process graphic (2).

The assigner 22 of the shortcut navigator 20 may be adapted to assign the entity to a specific key of the physical keyboard as a response to an operator striking that key. Alternatively, or in addition to such a keyboard interaction, the assigner 22 may be adapted to assign an entity of the process graphic to a key (13) as a response to an operator performing a drag-and-drop action using the mouse (14), which drag-and-drop action moves the entity of the process graphic to a key (16) of the virtual keyboard (15).

The shortcut navigator 20 further comprises an appearance controller 23, which appearance controller 23 modifies the appearance of the keys 16 of the virtual keyboard 15. The appearance controller 23 is provided to modify the appearance of a key 16 when a shortcut is assigned to that key 16, (or more correctly to the corresponding key 13 of the physical keyboard 12).

The virtual keyboard 15 is illustrated having four keys, Q, W, E, R. Q and R appear as "normal" keys provided only with a respective indication of the corresponding letters Q and R, respectively. W and E have been assigned a shortcut and appear with the corresponding letters W and E, respectively; in combination with a graphical representation of the destination of the shortcut they have been assigned. Key W of the physical keyboard has been linked to a trend diagram of an object, and the corresponding key W of the virtual keyboard is therefore inscribed with a trend curve by the appearance controller 23. Key E has similarly been linked to a process graphic called "BAKE", and has been inscribed with "BAKE" and a thumbnail picture of the process graphic "BAKE".

The shortcut navigator also comprises a state controller 24, which state controller 24 is adapted to change the appearance in response to a change of state of the shortcut destination.

The shortcut navigator is in this way adapted to present a virtual keyboard wherein the destination of each shortcut key is illustrated by a thumbnail provided by the appearance controller 23 and the state of the destination is made distinguishable by the state controller 24. Every time the presenter 21 introduces the virtual keyboard, its appearance corresponds to the appearance and state, as provided by appearance controller 23 and state controller 24. Moreover, it is suitable to dynamically update the appearance of an already overlaid keyboard as long as the keyboard is visible. Such an update is based on data provided to the workstation from events in the industrial system.

The shortcut navigator 20 also comprises a retriever 25 for retrieving the process graphic of the shortcut destination. The retriever 25 is adapted to retrieve the process graphic as a response to an operator striking a key to which a shortcut has been assigned. For example, when the virtual keyboard is presented in a process graphic, the user may strike a key to which has been assigned a shortcut, such as "W" or "E" in FIG. 3. As a response the retriever 25 moves the operator to the destination; the trend (in case of "W") and the process graphic "BAKE" (in case of "E"); i.e. the retriever 25 retrieves the process graphic of the trend, or process graphic of process "BAKE", respectively, and displays this process graphic on the HMI.

Figure 4:
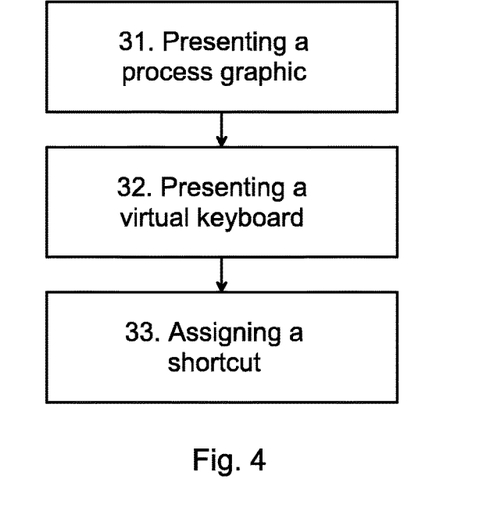
FIG. 4 illustrates a method for navigating an HMI according to the invention, FIG. 5 illustrate a system for monitoring and control of an industrial process, wherein the invention can be implemented.

FIG. 4 illustrates a method for navigating an HMI of a work station that is used to control and monitor an industrial process. The method starts with the step of presenting a process graphic 31. After step 31 the method includes a step of presenting 32 a virtual keyboard in the process graphic. After presenting the virtual keyboard the method includes a step of assigning a shortcut 33 to the presented process graphic or to an entity of the presented process graphic, which shortcut couples a specific key of the physical keyboard to the presented process graphic, or to the process graphic of the entity, respectively. Such entity may be a trend diagram.

The method steps 31, 32, and 33 are performed by the work station. An operator interacting with the work station controls the creation of shortcuts by operating keyboard and mouse. When the operator wants to create a shortcut upon viewing a process graphic, he may do so by striking a key on the keyboard dedicated to presenting the virtual keyboard. The work station is adapted for operator interaction and will present (32) the virtual keyboard in the process graphic as a response to the keystroke.

Moreover, the assigning of the shortcut to the specific key could be performed as a response to an operator striking that specific key on the physical keyboard, so an operator wishing to add a shortcut may do so by striking a key. In this way a shortcut may be assigned to the currently displayed process graphic, which may be a process graphic of a subarea of the industrial process, a process graphic of an object of the industrial process, or a process graphic of an entity of such an object.

Instead of assigning a shortcut to the process graphic currently being displayed, the shortcut navigator should suitably be adapted to include functions for creating shortcuts to other destinations. For example, create shortcuts to an object in the currently displayed process graphic, i.e. the destination is the process graphic of the object in question. Such a function can be implemented for example so that when a cursor, i.e. the mouse controlled cursor, is positioned on an object in a process graphic, the assigner will couple a key being pressed to the process graphic of the object, without the need for the operator to open the object. A further function that suitably can be implemented is that when viewing a context menu of an object. For example, such viewing can suitably be implemented to be performed when an operator is right-clicking with the mouse on an object and, as response; a context menu is presented in the process graphic. Moving of the cursor, by means of the mouse or keyboard, to mark an item in the context menu, such as an item in a drop down list, the assigning of the shortcut can be made to the process graphic of that item, such as a trend diagram, or to an alarm of the object.

The method of FIG. 4 should suitably include some additional steps. When presenting the virtual keyboard, the graphical representation of keys that already provide shortcuts is made different from the other keys. For example, such a preferred method includes retrieving data of the process graphic of the destination and presenting a thumbnail picture of the process graphic. The method may also dynamically update the graphical representation to reflect state in the process graphic of the shortcut. Such updating can suitable be done when the virtual keyboard is presented, and also as long as the virtual keyboard is visible.

What is claimed is:

1. Work station for monitoring and control of an industrial process comprising:
   a human machine interface unit presenting the industrial process in process graphics for an operator, the interface unit being communicatively and operatively connectable to an industrial process,
   characterised in that the work station has a shortcut navigator for coupling a key of a physical keyboard to a process graphic or entity of a process graphic, wherein the shortcut navigator includes:
      a presenter adapted to present a virtual keyboard in the process graphic, the virtual keyboard having keys which correspond to keys on the physical keyboard, and
      an assigner adapted to assign a shortcut to the process graphic or entity of the process graphic currently presented,
   wherein the shortcut navigator couples a specific key of the physical keyboard to the presented process graphic or to the process graphic of the entity, the shortcut navigator further includes
      an appearance controller, the appearance controller being adapted to modify a graphical representation of a virtual key in the virtual keyboard when the virtual key provides a shortcut, wherein the graphical representation of the virtual key in the virtual keyboard is modified to present a thumbnail picture of the process graphic to which it provides the shortcut, and
      a state controller, the state controller being adapted to modify the graphical representation to reflect a changed state of the industrial process monitored in the process graphic coupled to the key of the physical keyboard by the shortcut, monitor the state of a destination of the shortcut, and update the state dynamically.

2. The work station according to claim 1, wherein the assigner couples the specific key of the physical keyboard upon the operator striking that specific key on the physical keyboard.

3. The work station according to claim 1, wherein the shortcut navigator presents the virtual keyboard upon the operator striking a dedicated navigator key on the physical keyboard.

4. The work station according to claim 1, wherein the virtual keyboard is presented as an overlay, with the process graphic visible behind the virtual keyboard.

5. A system for monitoring and control of an industrial process, the system being communicatively and operatively connectable to an industrial process, wherein the system comprises a work station according to claim 1.

6. A method for assigning a shortcut to a process graphic of a human machine interface, the human machine interface being adapted to present an industrial process to an operator in process graphics of the industrial process, being communicatively and operatively connectable to the industrial process, and including a physical keyboard arranged for the operator to interact with the process graphics, the method comprising:
   presenting a process graphic, characterised by presenting a virtual keyboard in the process graphic, the virtual keyboard having keys which correspond to keys on the physical keyboard,
   assigning a shortcut to the presented process graphic or to an entity of the presented process graphic, the shortcut coupling a specific key of a physical keyboard to the presented process graphic or to the process graphic of the entity,
   modifying a graphical representation of a virtual key in the virtual keyboard, when the virtual key provides a shortcut, wherein the virtual key in the virtual keyboard is modified into presenting a thumbnail picture of the process graphic to which it provides a shortcut,
   modifying the graphical representation to reflect a changed state of the industrial process monitored in the process graphic coupled to the key of the physical keyboard by the shortcut,
   monitoring the state, and
   repeating the modifying when the monitored state changes.

7. The method according to claim 6, wherein the assigning of the specific key of the physical keyboard is performed as a response to the operator striking that specific key on the physical keyboard.

8. The method according to claim 6, wherein the presenting of the virtual keyboard in a process graphic is performed as a response to the operator striking a key, dedicated for navigation, on the physical keyboard.

9. The method according to claim 6, wherein the presenting of the virtual keyboard includes presenting the virtual keyboard as an overlay, with the process graphic visible behind the virtual keyboard.

10. A computer program product stored on a non-transitory computer readable medium for monitoring and control of an industrial process, the computer program product being adapted for controlling a work station, which is communicatively and operatively connectable to the industrial process, the work station comprising a human machine interface unit for presenting the industrial process in process graphics for an operator and including a physical keyboard arranged for the operator to interact with the process graphics, wherein the computer program product is adapted to enable the work station to assign a shortcut to a process graphic of the human machine interface in accordance with the method comprising:

presenting a process graphic, characterised by presenting a virtual keyboard in the process graphic, the virtual keyboard having keys which correspond to keys on the physical keyboard, assigning a shortcut to the presented process graphic or to an entity of the presented process graphic, the shortcut coupling a specific key of a physical keyboard to the presented process graphic or to the process graphic of the entity, and modifying a graphical representation of a virtual key in the virtual keyboard, when the virtual key provides a shortcut, wherein the virtual key in the virtual keyboard is modified into presenting a thumbnail picture of the process graphic to which it provides a shortcut, modifying the graphical representation to reflect a changed state of the industrial process monitored in the process graphic coupled to the key of the physical keyboard by the shortcut, monitoring the state, and repeating the modifying when the monitored state changes.

11. The work station according to claim 1, wherein the keys of the virtual keyboard are provided with symbols that correspond to symbols on the keys of the physical keyboard.

12. The work station according to claim 1, wherein the layout of the keys of the virtual keyboard corresponds to the layout of the keys of the physical keyboard.

* * * * *